United States Patent
Mathews, Jr. et al.

(10) Patent No.: US 6,233,864 B1
(45) Date of Patent: May 22, 2001

(54) NOISE-MAKING FISHING LURE

(76) Inventors: Richard S. Mathews, Jr., 2039 SW. 4th St., Lee's Summit, MO (US) 64043; Robert G. Link, 4901 Blue Ridge Blvd., Kansas City, MO (US) 64133

( * ) Notice: Subject to any disclaimer, the term of this patent is extended or adjusted under 35 U.S.C. 154(b) by 0 days.

(21) Appl. No.: 09/320,146

(22) Filed: May 26, 1999

(51) Int. Cl.[7] .................................................. A01K 85/00
(52) U.S. Cl. .................... 43/42.31; 43/42.15; 43/42.02
(58) Field of Search ........................... 43/42.02, 42.15, 43/42.31

(56) References Cited

U.S. PATENT DOCUMENTS

| | | | |
|---|---|---|---|
| 1,093,980 | * | 4/1914 | Donaly .................................. 43/42.15 |
| 1,857,939 | * | 5/1932 | Cameron ............................... 43/42.31 |
| 2,467,640 | | 4/1949 | Turner . |
| 2,617,226 | | 11/1952 | Yoshii . |
| 2,739,407 | * | 3/1956 | Godsey ................................. 43/42.15 |
| 2,835,068 | * | 5/1958 | Latham ................................ 43/42.31 |
| 2,876,580 | | 3/1959 | Schwartztrauber . |
| 3,000,130 | | 9/1961 | Pankuch . |
| 3,172,227 | * | 3/1965 | Mackey ................................ 43/42.31 |
| 3,220,139 | * | 11/1965 | Bessler ................................. 43/42.02 |
| 3,226,875 | * | 1/1966 | Woolums ............................. 43/42.31 |
| 3,530,612 | | 9/1970 | Garrison . |
| 3,831,307 | | 8/1974 | Pittman . |
| 3,987,576 | * | 10/1976 | Strader ................................. 43/42.16 |
| 4,038,773 | | 8/1977 | Castelletti et al. . |
| 4,163,338 | | 8/1979 | Lucarini . |
| 4,202,127 | | 5/1980 | Marek . |
| 4,208,822 | * | 6/1980 | Bryant ................................. 43/42.02 |
| 4,287,679 | * | 9/1981 | Klotz .................................... 43/42.09 |
| 4,823,501 | | 4/1989 | Standish, Jr. . |
| 4,918,854 | | 4/1990 | Webre, Jr. . |
| 5,144,765 | | 9/1992 | Keeton . |
| 5,381,622 | * | 1/1995 | Tregre ................................. 43/42.31 |
| 5,428,919 | * | 7/1995 | Enomoto ............................. 43/42.31 |
| 5,566,497 | * | 10/1996 | Oesterreich ......................... 43/42.16 |
| 5,661,922 | | 9/1997 | Bonomo . |

* cited by examiner

*Primary Examiner*—Kurt Rowan
(74) *Attorney, Agent, or Firm*—Shughart Thomson & Kilroy P.C.; Mark E. Brown

(57) ABSTRACT

A fishing lure having a body with two sections that move relative to one another. An aft section is connected via a shaft to a fore section and is slidable toward and away from that section along the shaft as the lure is pulled through the water. A metal contact surface is mounted on a rear end of the fore section, and a metal striker is mounted on a front end of the aft section. The lure is tied to a fishing line. As the lure is pulled through the water by tugging the fishing line, the aft section's striker contacts the fore section's disc producing a clicking or popping sound which attracts fish.

6 Claims, 2 Drawing Sheets

US 6,233,864 B1

NOISE-MAKING FISHING LURE

BACKGROUND OF THE INVENTION

1. Field of the Invention

The present invention relates generally to fishing tackle, and in particular to a fishing lure with reciprocating body sections that engage one another to produce clicking or popping noises.

2. Description of the Related Art

Fish may be attracted by a fishing lure's features such as shape, color, or sounds produced by the lure. A lure which possesses desirable characteristics will attract fish. The particular characteristics which are attractive can vary depending upon the environment. For example, in clear water fish may become attracted from a distance by a brightly colored lure, or by a lure that moves similar to live prey. Conversely, in muddy water, fish may first become attracted to a noise-making type lure. Then, as fish approach the lure, they may also become attracted by other characteristics.

The prior art includes various noise-making lures of different sizes, shapes, colors and other features. For example, U.S. Pat. No. 3,530,612 to Garrison discloses a fishing lure having a noisemaker. The Garrison lure includes a tooth mounted to a main portion thereof and a disc mounted to a top portion thereof. When the lure is pulled through water, the tooth continuously engages the disc, producing noise. Others have designed different lures for similar purposes. However, such lures generally are more complicated in construction and, therefore, more expensive to manufacture and more difficult to use.

The present invention addresses the shortcomings of the previous fishing lures. Heretofore there has not been available a noise-making fishing lure with the advantages and features of the present invention.

SUMMARY OF THE INVENTION

The present invention generally comprises a fishing lure having a body that is divided into two sections that move relative to one another, and a longitudinal axis generally corresponding to a direction-of-travel of the fishing lure. An aft section is connected via a shaft to a fore section and is slidable toward and away from the fore section along the shaft such that the aft section intermittently contacts the fore section as the lure is pulled through the water.

More particularly, an impact member with an outer contact surface is mounted on a proximate end of the fore section, and a striker is mounted on a proximate end of the aft section. The lure is tied to a fishing line. As the lure is pulled through the water by tugging the fishing line, the striker intermittently contacts the contact surface producing a clicking or popping sound which attracts fish.

The visual appearance of the present invention is also attractive to fish. Namely, the sliding movement of the aft section with respect to the fore section as the lure is pulled through the water produces a "wounded prey" effect. Thus, the present invention is attractive to fish for several reasons, and has characteristics unlike any prior art lures.

OBJECT AND ADVANTAGES OF THE INVENTION

The principle objects and advantages of the present invention include: providing a noise-making fishing lure which attracts and catches fish; providing such a lure with reciprocating body sections that intermittently produce a noise by contacting one another as the lure is pulled through the water; providing such a lure which simulates the appearance of a "wounded prey" when it moves atop water; providing such a lure which is self-ballasting; providing such a lure which is relatively simple to manufacture; and providing such a lure which is particularly well-adapted for the intended usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

I. Introduction and Environment

Figure 1:
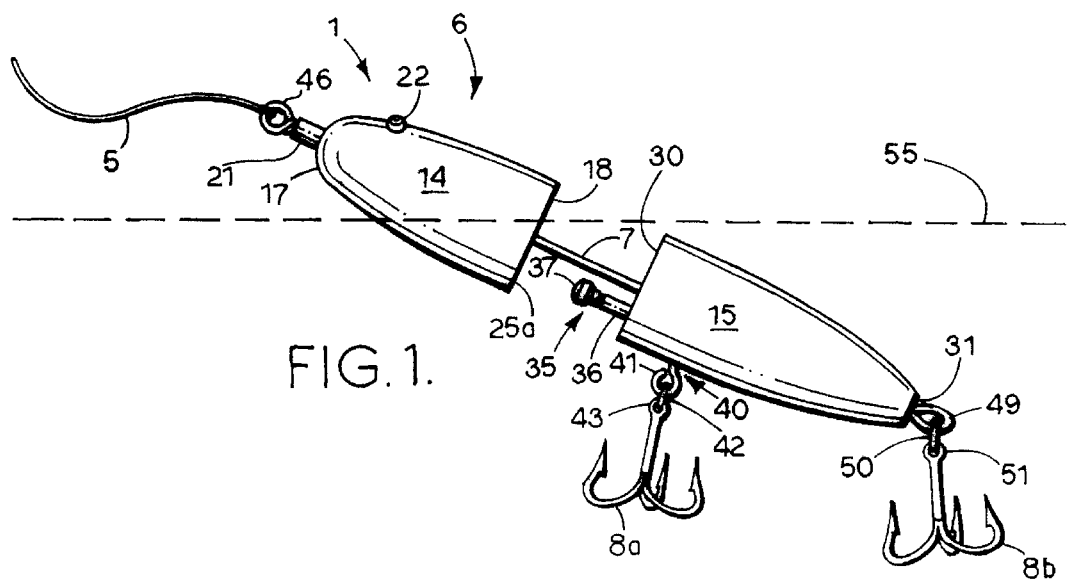
FIG. 1 is a side elevational view of a noisemaking fishing lure embodying the present invention in an extended configuration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly", and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings and FIG. 1 in greater detail, the reference numeral 1 generally refers to a noisemaking fishing lure embodying the present invention. The fishing lure 1 can be attached to a length of fishing line 5 and generally comprises a two-part body 6, a shaft 7, and a hooking device 8.

II. Fishing Lure Body 6, Shaft 7 and Hooking Device 8

Figure 3:
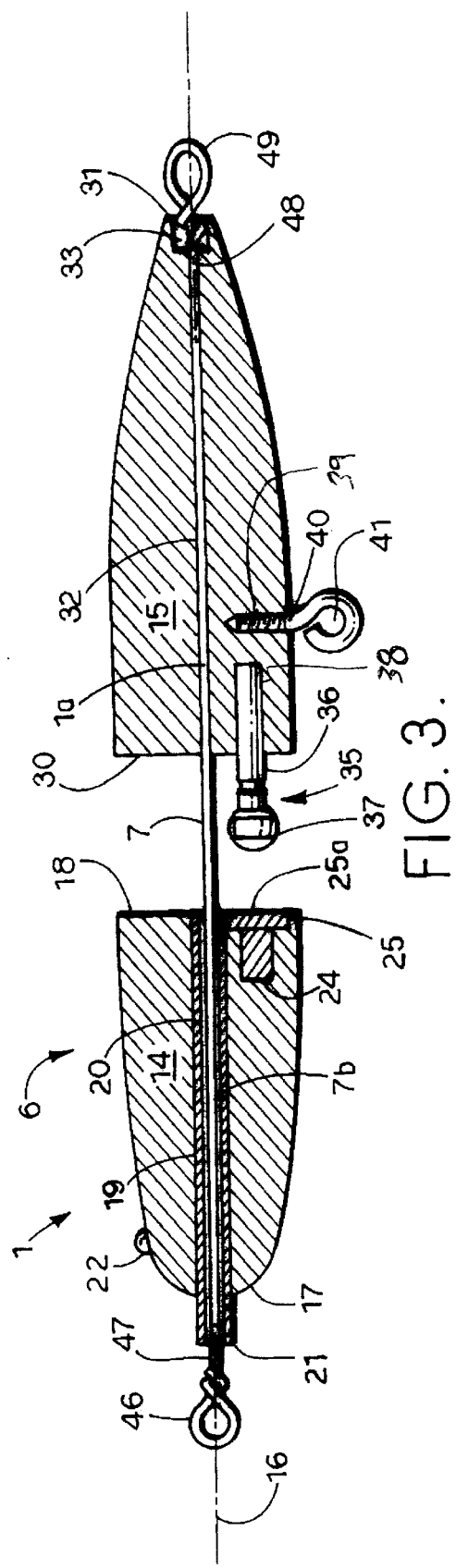
FIG. 3 is a sectional view of the fishing lure in its extended configuration.

The body 6 can be made of any suitable material including wood, plastic, ceramics, rubber, etc. The body 6 comprises a pair of body sections including a generally cylindrical fore section 14 and a generally cylindrical aft section 15. In operation, the fore section 14 and aft section 15 move relative one another about a longitudinal axis 16 (FIG. 3) generally corresponding to a direction-of-travel of the fishing lure 1.

The fore section 14 includes a rounded or dome-like distal end 17, and a flat proximate end 18. A bore 19 extends lengthwise through the geometric center of the fore section 15. A barrel 20 including a distal end or nose 21 lines the interior of the bore 19 and is attached therein by any suitable means (e.g. glueing with a water-proof adhesive, friction fitting). The barrel 20 can be constructed of any suitable material including plastic. The nose 21 extends beyond the distal end 17 of the fore section 14. A relatively small semi-spherical fish eye 22 is attached by any suitable means (e.g. glueing with a water-proof adhesive) to a top portion of the fore section 15 near the distal end 17. A cylindrical, metallic ballasting member 24 and an disc-like impact member 25 are countersunk and attached by any suitable means (e.g. glueing with a water-proof adhesive or friction fitting) to a lower portion of the fore section's proximate end 18 The impact member 25 includes an outer contact surface 25a, the purpose of which will be discussed later.

The aft section 15 includes a flat proximate end 30, and a tapered distal end 31. A bore 32 extends lengthwise through the geometric center of the aft section 15. A notch 33 is formed in the aft section's distal end 31. A metallic striker 35 including a shaft 36 and a head 37 is attached by any suitable means to a lower portion of the aft section's proximate end 30. For example, the striker 35 can be attached by countersinking the shaft 36 into a first receiver 38 in the aft section's proximate end 30 and secured therein by a friction fit, or secured with a water-proof adhesive. The aft section 15 also includes a second receiver 39 located at a bottom portion thereof for receiving a threaded end of a screw 40. The screw 40 includes an eye 41 mounting a ring 42 attached to an eye 43 of a first hooking device 8a. The hooking device 8a is free to move in multiple directions about the eye 41.

The fore section 14 and the aft section 15 are both connected to the shaft 7. The shaft 7 is inserted into the aft section's bore 32 and secured thereto along a distal portion 7a of the shaft 7 by any suitable means (e.g. gluing with a waterproof adhesive, friction fitting). The shaft 7 is also inserted into the fore section's barrel 20. The fore section 14 can slide relative the shaft along a proximate portion 7b of the shaft 7.

The shaft 7 includes a first shaft eye 46 located at a proximate end 47 of the shaft 7. Fishing line 5 is attached to the lure 1 at the eye 46. The shaft 7 terminates at a distal end 48 where a second shaft eye 49 mounts a ring 50 attached to an eye 51 of a second hooking device 8b. The hooking device 8b is free to move in multiple directions about the eye 49.

III. Operation

The fishing line 5 with the lure 1 attached thereto may be cast into or positioned in a body of water 55. In the present embodiment, the fishing lure 1 will float atop the water 55 due to the buoyancy of the body 6. It should be noted that the aft section 15 is less buoyant than the fore section 14 such that the aft section 15 will tend to sink with respect to the fore section 14 when the lure 1 is placed into the body of water 55 (FIG. 1).

Figure 2:
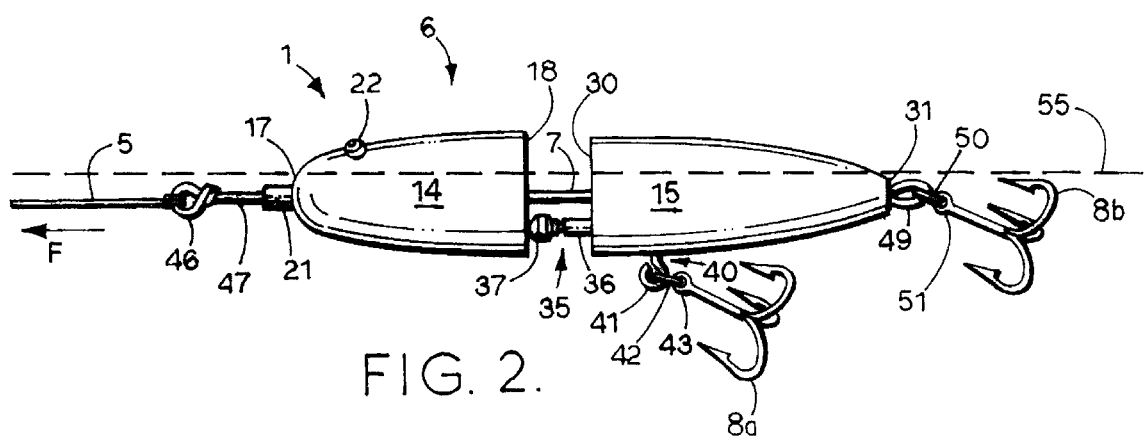
FIG. 2 is a side elevational view of the fishing lure in a contracted configuration.

When a force F (FIG. 2) is imparted to the fishing line 5, for example by an angler tugging at the line 5, the force F will pull the shaft 7 and the aft section 15 toward the fore section 14. Resistant forces created by water 55 surrounding the fore section 14 allow it to remain relatively static when the force F is applied to the fishing line 5. Thus, the aft section 16 moves into the fore section 15 and causes the striker head 37 to contact the impact surface 25a which results in a clicking or popping noise. This process can be repeated in an attempt to "bait" fish into striking the lure 1, and capturing said fish on the hooking devices 8a, 8b.

It is to be understood that while certain forms of the present invention have been illustrated and described herein, it is not to be limited to the specific forms or arrangement of parts described and shown.

What is claimed and desired to be secured by Letters Patent is as follows:

1. A noise-producing fishing lure, which comprises:

(a) a body having a longitudinal axis generally corresponding to a direction of travel of the fishing lure including:

(1) a fore section including fore section front and back ends, a fore section bore extending generally parallel to or coaxial with said axis between and open at said fore section front and back ends; and (2) an aft section including aft section front and back ends;

(b) a shaft with a fore end and an aft end fixedly mounted on said body aft section, said shaft extending generally parallel to or coaxial with said axis from said aft section front end;

(c) said fore section slidably mounted on said shaft with said fore section bore longitudinally slidably receiving said shaft;

(d) a contact post fixedly attached to said aft section front end, said contact post being adjacent to said shaft and oriented generally parallel to said shaft, said contact post impacting said fore section back end to create a sound, said contact post having a distal end with an area substantially smaller than said fore section back end;

(e) said shaft having a front end with a line attachment for attaching a line to said lure; and (f) a hook attachment for attaching a hook to said body.

2. The fishing lure of claim 1 wherein the aft section is less buoyant than the fore section.

3. The fishing lure of claim 1 wherein the fore section front end is dome-shaped.

4. The fishing lure of claim 1 wherein the shaft includes a first eye located at one shaft end and a second eye located at the other shaft end.

5. The fishing lure of claim 1 wherein a fish eye is attached to the lure.

6. The fishing lure of claim 1 further comprising a receiver located in one of said body sections for receiving a screw and mounting a hooking device.

* * * * *